United States Patent
Zook et al.

(10) Patent No.: US 11,945,585 B2
(45) Date of Patent: Apr. 2, 2024

(54) CONTROL SURFACE SUPPORT FOR AN AIRCRAFT

(71) Applicant: Lockheed Martin Corporation, Bethesda, MD (US)

(72) Inventors: Trevor A. Zook, Stratford, CT (US); Jason Quevedo, Stratford, CT (US); Ken Chu, Stratford, CT (US); David Tam, Seymour, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/672,376

(22) Filed: Feb. 15, 2022

(65) Prior Publication Data

US 2023/0257103 A1  Aug. 17, 2023

(51) Int. Cl.
*B64C 9/02* (2006.01)
*B64C 29/00* (2006.01)

(52) U.S. Cl.
CPC ............ *B64C 9/02* (2013.01); *B64C 29/0025* (2013.01)

(58) Field of Classification Search
CPC .... B64C 5/02; B64C 5/04; B64C 5/10; B64C 5/08; B64C 3/50; B64C 9/18
See application file for complete search history.

(56) References Cited

U.S. PATENT DOCUMENTS

| | | | | |
|---|---|---|---|---|
| 2,390,939 A | * | 12/1945 | Huff | B64C 9/10 244/99.3 |
| 2,650,045 A | * | 8/1953 | Hunt | B64C 23/005 244/66 |
| 2,665,084 A | | 1/1954 | Feeney | |
| 3,630,328 A | | 12/1971 | Nelson | |
| 4,318,304 A | | 3/1982 | Lang | |
| 5,884,872 A | * | 3/1999 | Greenhalgh | B64C 9/30 244/130 |
| 8,033,500 B1 | * | 10/2011 | Charafeddine | B64C 9/02 244/99.2 |
| 8,291,782 B1 | * | 10/2012 | Shaheen | F16H 25/2472 74/89.34 |
| 2009/0159755 A1 | * | 6/2009 | Gonzalez Gozalbo | B64C 9/02 244/99.2 |
| 2012/0267473 A1 | * | 10/2012 | Tao | B64C 5/12 244/46 |

(Continued)

FOREIGN PATENT DOCUMENTS

EP  0414531 B1  5/1994

*Primary Examiner* — Tien Q Dinh
*Assistant Examiner* — William L Gmoser
(74) *Attorney, Agent, or Firm* — Michael Best & Friedrich LLP (57) ABSTRACT

An aircraft includes a main body having an empennage, a main rotor assembly mounted on the main body, and a movable control surface assembly supported on the empennage. The movable control surface assembly includes a tube extending from the empennage along a tube axis to a free end, the tube being supported for rotation about the tube axis with respect to the empennage, and a movable control surface mounted on the tube for rotation therewith. The movable control surface is supported on the tube by a connection element that couples the movable control surface to the free end of the tube to rotatably fix the movable control surface with respect to the tube.

20 Claims, 9 Drawing Sheets

(56) References Cited

U.S. PATENT DOCUMENTS

| | | | |
|---|---|---|---|
| 2013/0320152 A1* | 12/2013 | Parker | B64C 9/34 244/90 A |
| 2019/0017569 A1 | 1/2019 | Eller | |
| 2020/0339253 A1* | 10/2020 | Embacher | B64C 5/02 |

* cited by examiner

CONTROL SURFACE SUPPORT FOR AN AIRCRAFT

STATEMENT OF GOVERNMENT INTEREST

This invention was made with government support under Award No. W911W6-19-9-0005, awarded by the Department of the Army. The U.S. Government has certain rights to this invention.

FIELD OF INVENTION

Embodiments described herein relate to aircraft control surfaces and, in particular, to methods for supporting control surfaces of an aircraft.

BACKGROUND

Aircrafts include control surface to help direct and stabilize the aircraft. These control surfaces are usually narrow, cantilevered surfaces subjected to high cycle vibration. An all-moving control surface is a structure with an airfoil profile that is wholly rotatable about an axis relative to a main body of the aircraft. In contrast, standard control surfaces are movably mounted to a stabilizer and form just a portion of the airfoil profile. All-moving control surface may be particularly susceptible to high cycle vibration.

SUMMARY

Embodiments described herein provide an aircraft including a main body having an empennage, a main rotor assembly mounted on the main body, and a movable control surface assembly supported on the empennage. The movable control surface assembly includes a tube extending from the empennage along a tube axis to a free end, the tube being supported for rotation about the tube axis with respect to the empennage, and a movable control surface mounted on the tube for rotation therewith. The movable control surface is supported on the tube by a connection element that couples the movable control surface to the free end of the tube to rotatably fix the movable control surface with respect to the tube.

Embodiments described herein provide an aircraft including a main body extending between a nose and a tail, a main rotor assembly mounted on the main body between the nose and the tail, a stabilizer extending out from the tail to an outer end, and a rudder assembly mounted to the outer end of the stabilizer. The rudder assembly includes a tube rotatably supported on the outer end of the stabilizer, the tube extending along a tube axis between a first end and a second end. A first rudder is supported on the tube by a first connection feature that engages the first end of the tube to rotatably fix the first rudder with respect to the tube. A second rudder is supported on the tube by a second connection feature that engages the second end of the tube to rotatably fix the second rudder with respect to the tube.

Embodiments described herein provide a method of assembling a control surface assembly to an empennage of an aircraft. The method includes providing the control surface assembly with a tube having a cylindrical body and a rudder with an opening and a connection feature. Then mounting the tube to the empennage so the tube extends from the empennage along a tube axis to a free end, wherein the tube is rotatable about the tube axis relative to the empennage. Then aligning the rudder so that the opening and the connection feature lie on the tube axis. Then moving the rudder toward the empennage along the tube axis until the free end of the tube passes through the opening and approaches the connection feature. Then rotating the rudder about the tube axis until an orientation of the connection feature matches an orientation of the free end. Then moving the rudder along the tube axis toward the empennage until the free end engages the connection feature and rotatably fixes the rudder to the tube. Finally, securing the rudder to the tube to axially fix the rudder relative to the tube.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
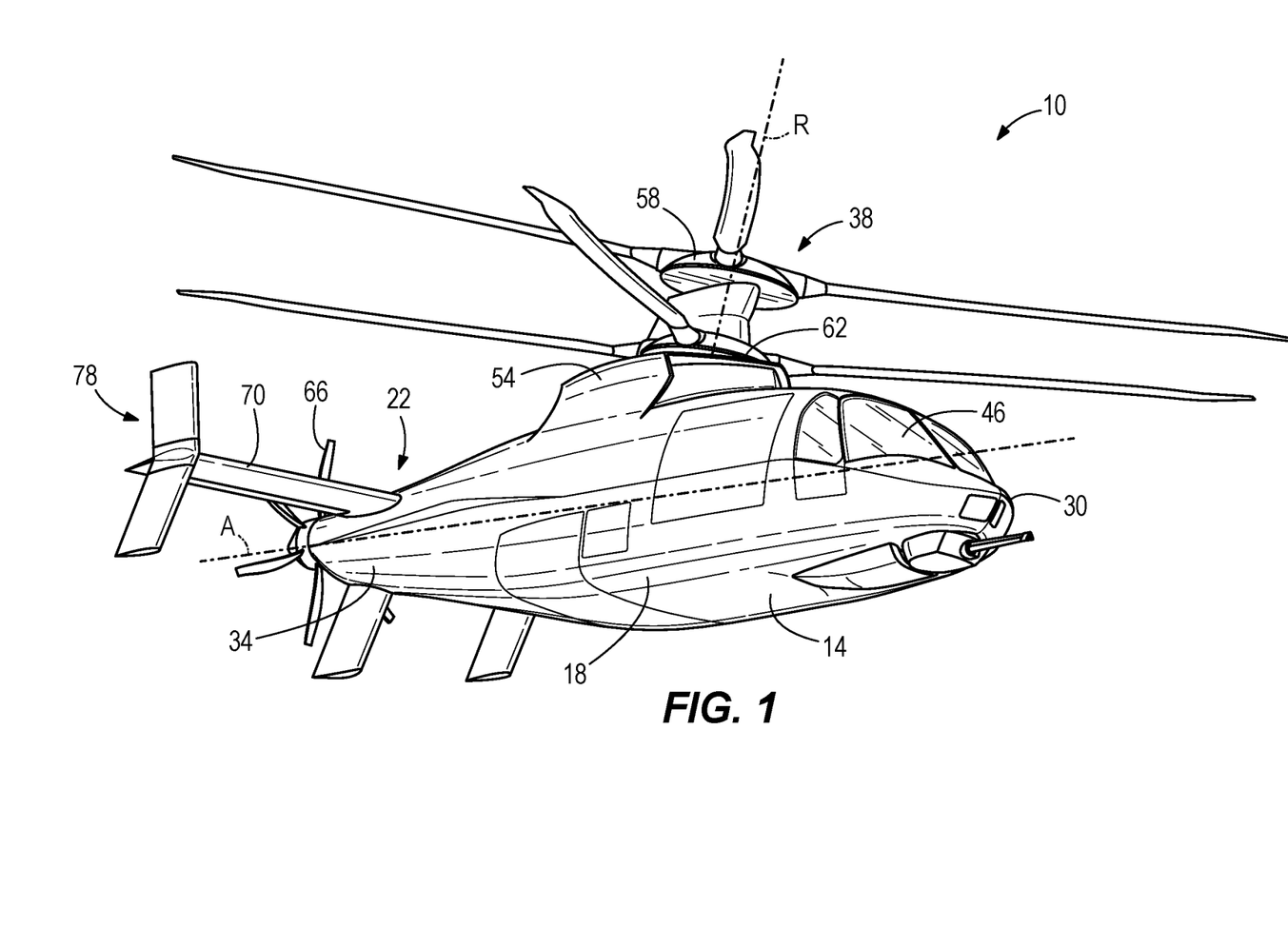
FIG. 1 illustrates an aircraft according to an exemplary embodiment.

Referring now to the figures, FIG. 1 illustrates a vertical take-off and landing (VTOL) aircraft 10 or rotary wing aircraft 10 according to some embodiments. The aircraft 10 includes a main body 14 including an airframe 18 and an empennage 22. The airframe 18 extends along a longitudinal axis A between a nose 30 and a tail 34. The longitudinal axis A defines forward and rearward directions of the aircraft 10 with forward being along the axis A toward the nose 30, and a rearward being along the axis A toward the tail 34. The aircraft 10 includes a rotor assembly 38 coupled to the main body 14 between the nose 30 and the tail 34. In the illustrated embodiment, the rotor assembly 38 is a dual, counter-rotating, co-axial main rotor assembly 38 that rotates about a rotor axis R. The axis R is generally perpendicular to the longitudinal axis A. Other embodiments may include different rotor assembly styles, for example, a single rotor assembly. The main body 14 defines a cockpit 46 in the airframe 18 having one or more seats for flight crew and optional passengers.

The main rotor assembly 38 is driven by a power source, such as, for example, one or more motors via a main rotor gearbox 54. The one or more motors can include an electric motor, a piston engine, a gas turbine, or other device for providing motion. The main rotor assembly 38 includes an upper rotor assembly 58 driven in a first direction (e.g., counter-clockwise) about the rotor axis R, and a lower rotor assembly 62 driven in a second direction (e.g., clockwise) about the rotor axis R, wherein the second direction is opposite to the first direction (i.e., to provide two counter rotating rotors). As illustrated in FIG. 1, the aircraft 10 also includes a propeller 66 located at the tail 34 to provide translational thrust (forward or rearward) for the aircraft 10. Although FIG. 1 illustrates the propeller 66 in the context of a pusher-propeller configuration, in other embodiments, the propeller 66 may be a puller-propeller. Similarly, in some embodiments, the propeller 66 may be mounted in a static configuration with respect to the aircraft 10 as illustrated in FIG. 1. However, in other embodiments, the propeller 66 has a variable position, which allows the propeller to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

With continued reference to FIG. 1, the empennage 22 includes the tail 34 of the main body 14, and a pair of horizontal stabilizers 70 extending out from the tail 34 portion. In the illustrated embodiment, the horizontal stabilizers 70 include elevators 74 (FIG. 2) attached to a rear end of the stabilizer 70. The aircraft 10 includes a movable control surface assembly 78 or rudder assembly 78 coupled to the empennage 22.

In the illustrated embodiment, the aircraft 10 includes horizontal stabilizers 70 with standard control surfaces (i.e., elevators 74), and the rudder assembly 78 positioned at the end of the horizontal stabilizer 70 is an all-moving rudder assembly. However, the principles described with reference to supporting the rudder assembly 78 on the end of the horizontal stabilizer 70 are equally applicable in supporting any all-moving control surfaces, regardless of their position on the aircraft 10. For example, a centrally located vertical stabilizer, or the horizontal stabilizers 70 themselves may be supported in the manner described. The description of the embodiment is not meant to limit the disclosure to a specific control surface, but instead is meant to apply to any all-moving control surface supported on an aircraft 10.

Figure 2:
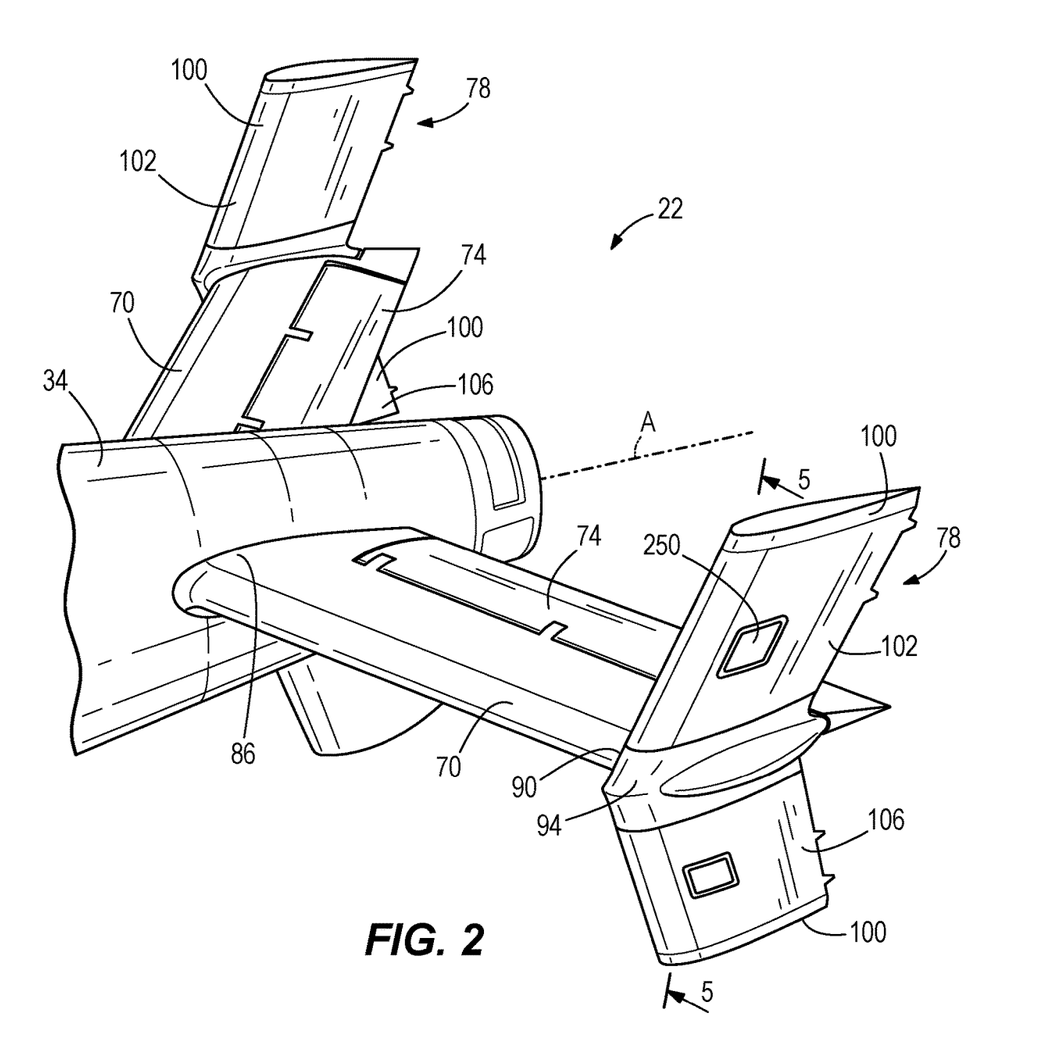
FIG. 2 illustrates an empennage of the aircraft of FIG. 1.

With reference to FIG. 2, the empennage 22 of the aircraft 10 generally has mirror symmetry across the longitudinal axis A. For simplicity's sake, only the left side of the aircraft 10 is described in detail. However, the right side is understood to include the same components described with reference to the left side, positioned symmetrically opposite the longitudinal axis A.

The horizontal stabilizer 70 extends from the tail 34 in a cantilevered fashion. The horizontal stabilizer 70 extends between a proximal end 86, secured to the tail 34, and a distal end 90. The horizontal stabilizer 70 has an aerodynamic profile. The elevator 74 is pivotally attached to a rear of the horizontal stabilizer 70. The elevator 74 can be used to adjust the aerodynamic profile to alter the lift, which can be controlled to direct the aircraft 10. The horizontal stabilizer 70 truncates in a fairing 94 fixed to the distal end 90.

The rudder assembly 78 is mounted to the distal end 90 of the horizontal stabilizer 70. The rudder assembly 78 includes a pair of rudders 100. The pair of rudders 100 includes an upper rudder 102 positioned above the stabilizer 70, and a lower rudder 106 positioned below the stabilizer 70. The upper rudder 102 and lower rudder 106 each have an aerodynamic profile.

Figure 3:
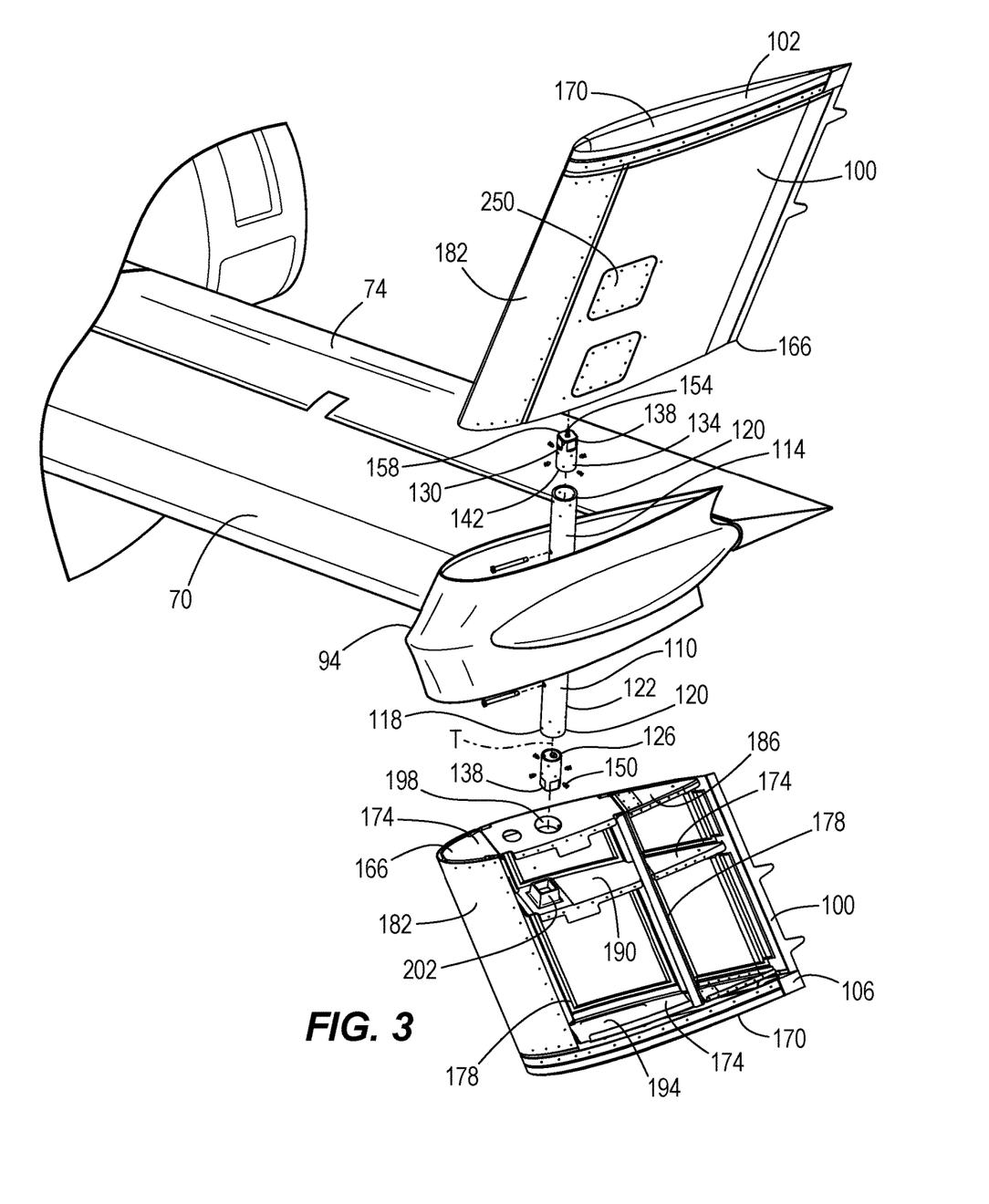
FIG. 3 illustrates an exploded view of a control surface assembly coupled to the empennage of the aircraft of FIG. 1, with portions removed.

Turning to FIG. 3, the rudder assembly 78 is shown in a partially exploded state. The rudder assembly 78 further includes a torque tube 110 mounted in the fairing 94. The torque tube 110 extends between a first end 114 and a second end 118 along a tube axis T. The torque tube 110 is supported in the fairing 94 for rotation about the axis T relative to the empennage 22. In the illustrated embodiment, the tube axis T extends generally vertically when the aircraft 10 is positioned on a horizontal surface. In other embodiments, the tube axis T may be oriented in other ways. As one example, when the control surface assembly 78 supports a horizontal stabilizer 70, the tube may be positioned so the axis is generally horizontal.

In the illustrated embodiment, the torque tube 110 is supported in the fairing 94 such that the first end 114 and the second end 118 are free ends 120. The torque tube 110 supports the upper rudder 102 and the lower rudder 106 for co-rotation about the tube axis T. In other embodiments, the torque tube 110 may only include one free end 120 and may therefore support just one control surface, for example, in embodiments where the control surface assembly 78 supports a central rudder. The upper rudder 102 and lower rudder 106 are mirrored symmetrically across the fairing 94 and are assembled to the torque tube 110 in substantially the same way. Therefore, the features and components of the rudder assembly 78 are described interchangeably with respect to the upper rudder 102 and the lower rudder 106.

With continued reference to FIG. 3, the torque tube 110 includes a cylindrical body 122 that is hollow and each end of the torque tube 110 includes a drive fitting 126 having a noncircular, external profile 130. In the illustrated embodiment, the noncircular profile 130 is generally square shaped. The drive fitting 126 may be formed integrally with the cylindrical body 122 or, as in the illustrated embodiment, may be a separate element coupled to the cylindrical body 122. The drive fitting 126 includes a mounting end 134 and a connection end 138. The mounting end 134 includes a cylindrical outer surface 142, sized and shaped to be received by the cylindrical body 122. As shown in more detail in FIG. 6, the mounting end 134 of the drive fitting 126 and the cylindrical body 122 each include a plurality of through holes 146 configured to receive a set of fasteners 150 to secure the drive fitting 126 to the cylindrical body 122. In the illustrated embodiment, the fasteners 150 are flanged anchors. In other embodiments, the fasteners 150 may be any type of fastener, for example nuts and bolts. In still other embodiments, the drive fitting 126 may be welded onto the cylindrical body 122 or connected in some other way. The drive fitting 126 includes a post 154 or stud 154 extending from an end face 158 of the connection end 138 along the tube axis T.

With continued reference to FIG. 3, each rudder 100 is generally hollow and extends between a proximal end 166 and a distal end 170. The rudder 100 includes ribs 174 extending laterally through the rudder 100, and spars 178 extending transverse to the ribs 174. The rudder 100 includes panels 182 mounted to the ribs 174 and spars 178 and forming the aerodynamic profile of the rudder 100. The ribs 174 includes a proximal rib 186, an intermediate rib 190, and a distal rib 194. The proximal rib 186 is disposed closest to the fairing 94. The intermediate rib 190 is positioned between the proximal rib 186 and the distal rib 194 and is located between the proximal end 166 and the distal end 170 of the rudder 100.

Figure 4:
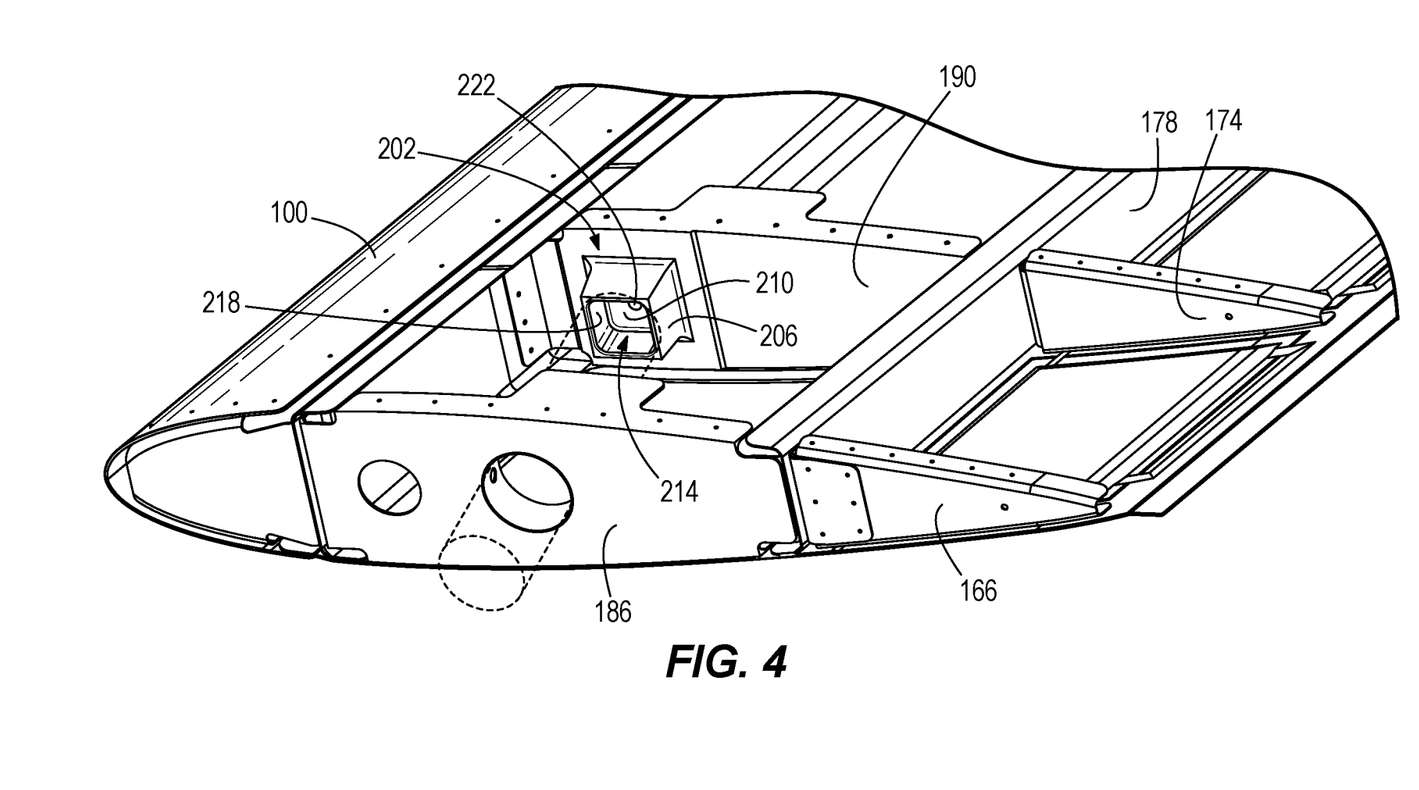
FIG. 4 is a perspective view taken of a control surface of the control surface assembly of FIG. 3, with portions removed.

As shown in FIG. 4, the proximal rib 186 includes an opening 198 that allows the torque tube 110 to pass therethrough. The opening 198 includes a circular profile corresponding to a size (e.g., an outer diameter) of the cylindrical body 122. The intermediate rib 190 includes a receptacle 202. In some embodiments the receptacle 202 is integrally formed in the rib. In other embodiments, the receptacle 202 is mounted to the intermediate rib 190. The receptacle 202 includes sidewalls 206 and an end wall 210 defining a cavity 214. The sidewalls 206 create a noncircular profile 218 of the cavity 214. In the illustrated embodiment, the noncircular profile 218 is square shaped and generally sized to correspond with the noncircular profile 130 of the drive fitting 126. A hole 222 extends through the end wall 210 of the receptacle 202 and through the intermediate rib 190.

Figure 5:
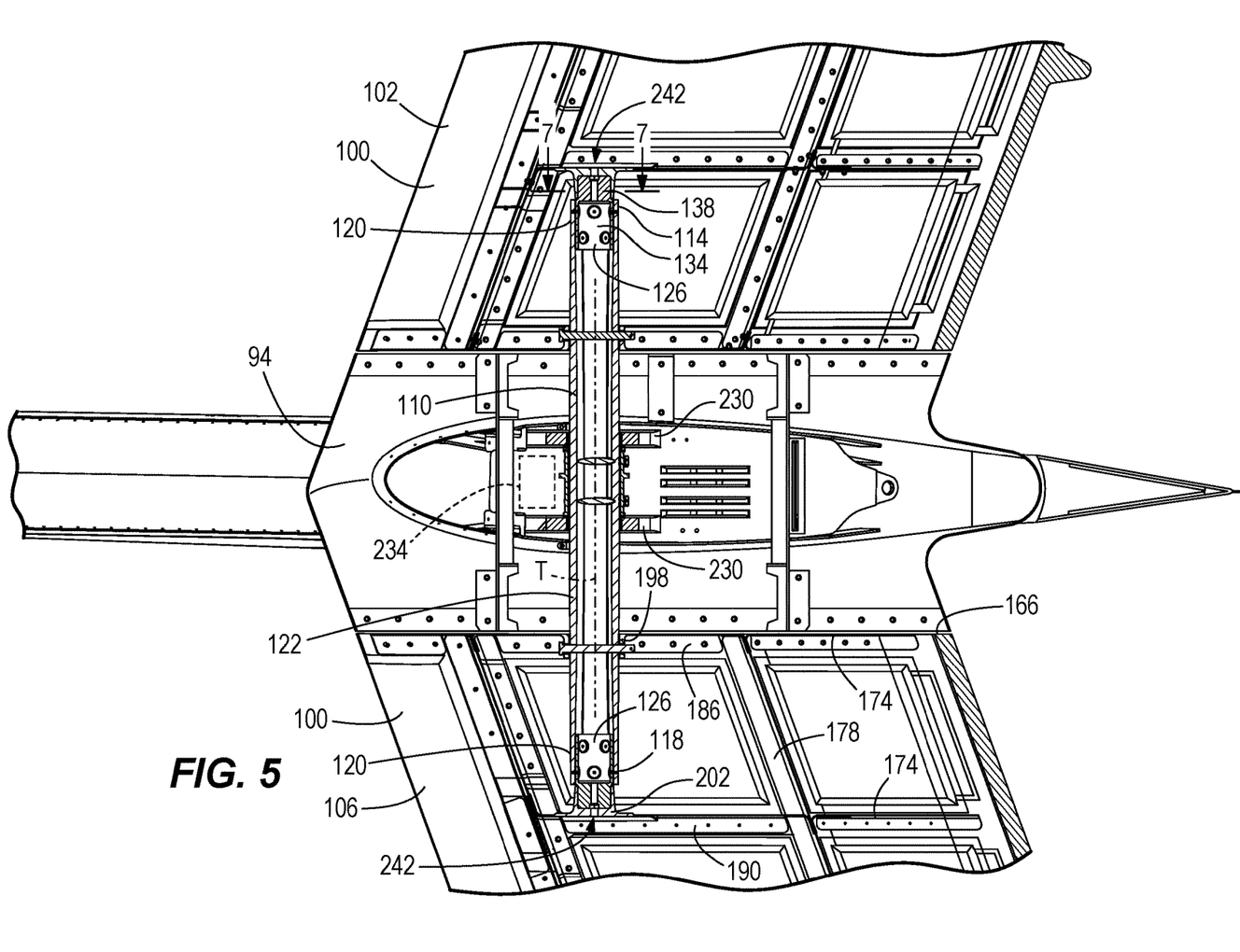
FIG. 5 is a sectional view of the assembled control surface assembly of FIG. 3, taken along the line 5-5 in FIG. 2.
Figure 6:
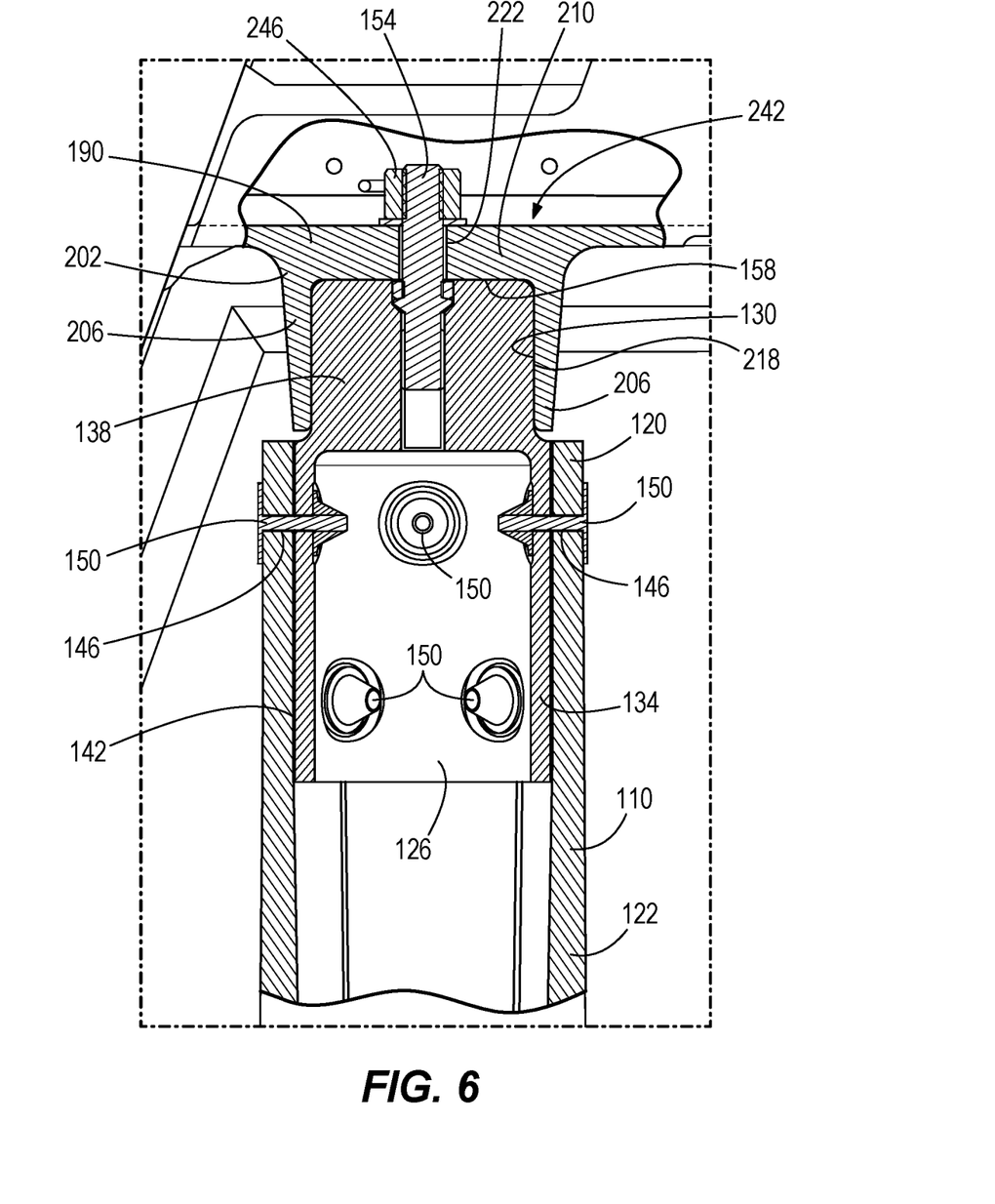
FIG. 6 is a detail view of the section view of FIG. 5.
Figure 7:
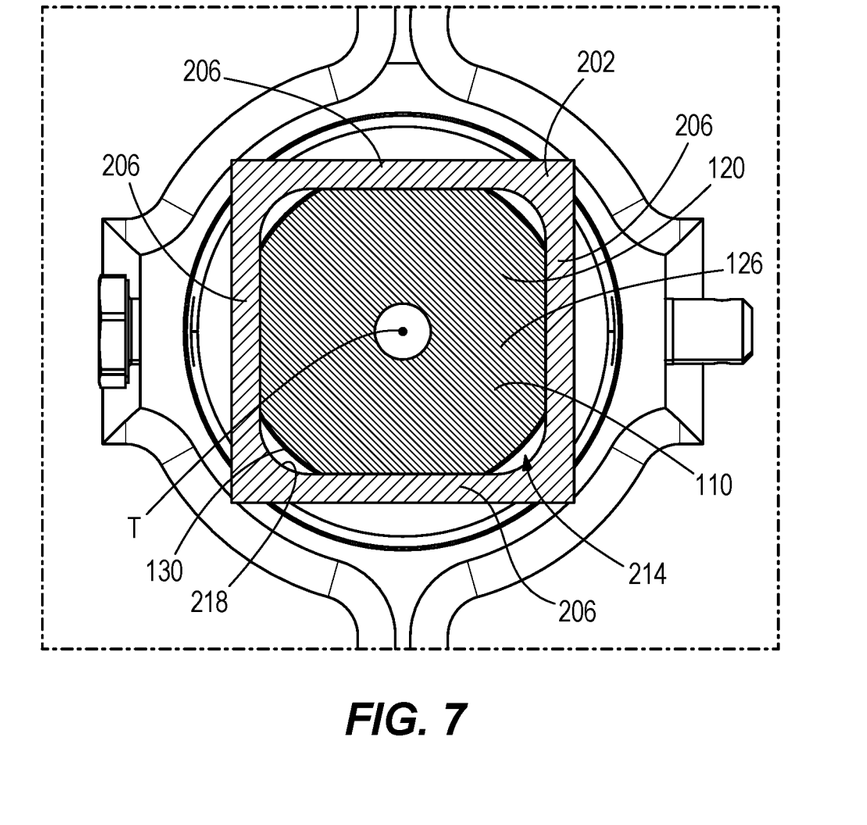
FIG. 7 is a section view of a connection point shown in FIG. 5 along line 7-7.

FIGS. 5-7 illustrate the rudder assembly 78 coupled to the distal end 90 of the horizontal stabilizer 70. The torque tube 110 is mounted in the fairing 94 for rotation about the tube axis T by brackets 230. An actuator 234 is also positioned in the fairing 94 and is able to receive signals from the cockpit 46 and to rotate the torque tube 110 about the tube axis T in response. Each rudder 100 is supported such that the proximal rib 186 is directly adjacent the fairing 94 and the distal end 170 of the rudder 100 is spaced from the fairing 94. The cylindrical body 122 of the torque tube 110 is surrounded by the opening 198 in the proximal rib 186. Each rudder 100 is supported on the torque tube 110 for rotation by a connection element 242 that couples the rudder 100 to the free end 120 of the torque tube 110. The connection element 242 includes the drive fitting 126 and the receptacle 202. Thus, the connection element 242 is at least partially positioned on the intermediate rib 190, and at least partially positioned on the torque tube 110. In the coupled position, the drive fitting 126 is received in the cavity 214 defined by the receptacle 202 so that the noncircular profiles 130, 218 rotatably fix the rudder 100 to the torque tube 110. In the illustrated embodiment, the receptacle 202 is positioned on the rudder 100 and the drive fitting 126 is positioned on the torque tube 110, however, in other embodiments, the drive fitting 126 may be positioned on the rudder 100 and the receptacle 202 may be formed in the torque tube 110.

As shown in FIG. 6, the drive fitting 126 is received in the cavity 214 of the receptacle 202 such that the end face 158 of the connection end 138 of the drive fitting 126 engages the end wall 210 of the cavity 214. The stud 154 extends through the hole 222 in the end wall 210 of the receptacle 202 and a fastener 246 is coupled to an end of the stud 154 to axially secure the drive fitting 126 to the receptacle 202, and by extension, the torque tube 110 to the rudder 100. In the illustrated embodiment, the stud 154 is threaded and the fastener 246 is a nut, threadably received on the end of the stud 154. In further embodiments other means of axially securing the drive fitting 126 to the receptacle 202 may be used.

As shown in FIG. 7, when the drive fitting 126 is received in the receptacle 202, the noncircular profiles 130, 218 engage to rotatably fix the rudder 100 to the torque tube 110. Specifically, the square profile allows rotation of the torque tube 110 to be transferred to the rudder 100. As discussed above, in the illustrated embodiment the noncircular profiles 130, 218 are generally square shaped. However, in other embodiments the noncircular profiles 130, 218 may be star shaped, keyed, or otherwise shaped to create a rotatable connection between the torque tube 110 and the receptacle 202.

Figures 8, 9:
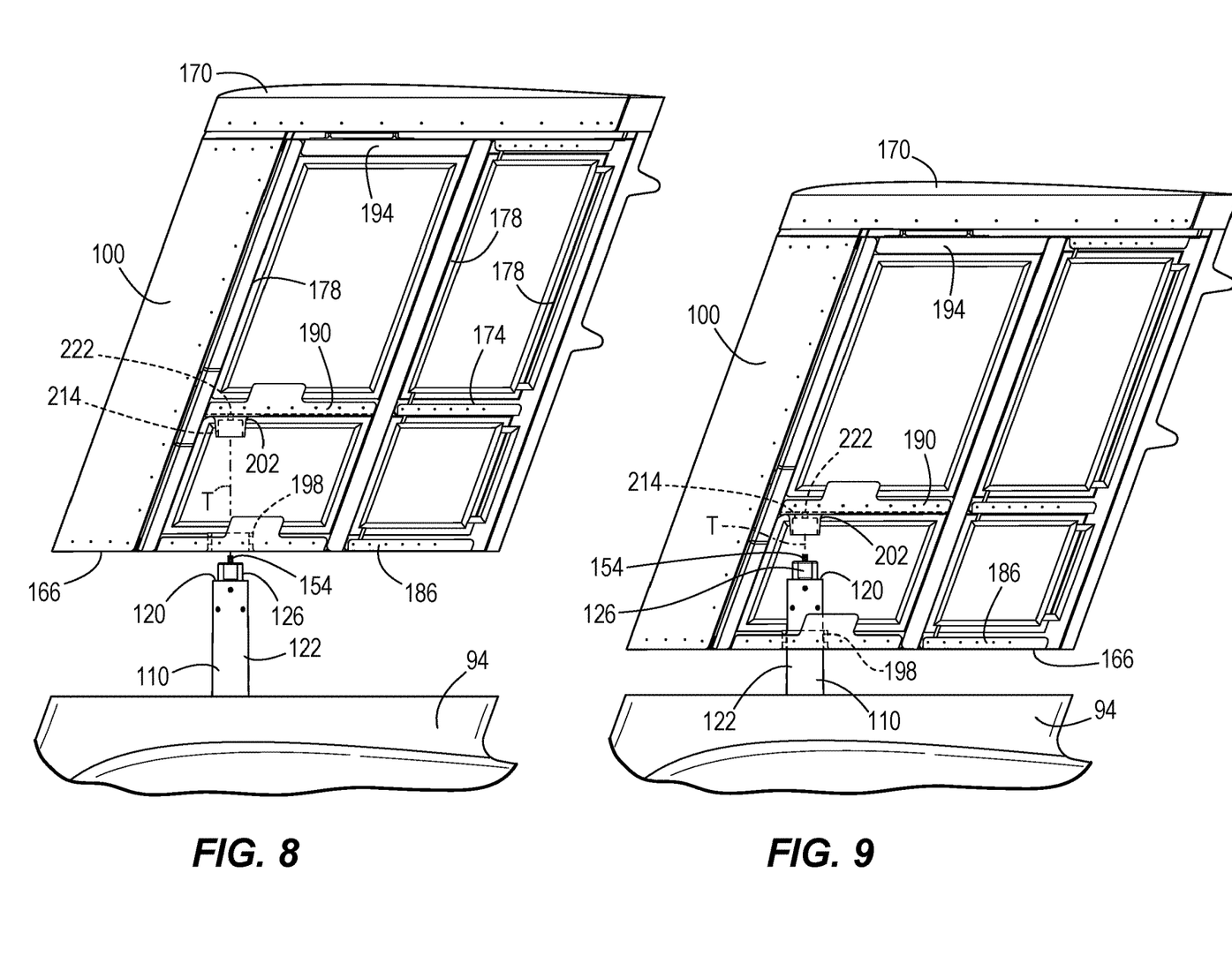
FIG. 8 illustrates the control surface of the control surface assembly of FIG. 3 in an assembly stage, with a portion of the control surface removed.
FIG. 9 illustrates the control surface of the control surface assembly of FIG. 3 in another assembly stage, with a portion of the control surface removed.
Figure 10:
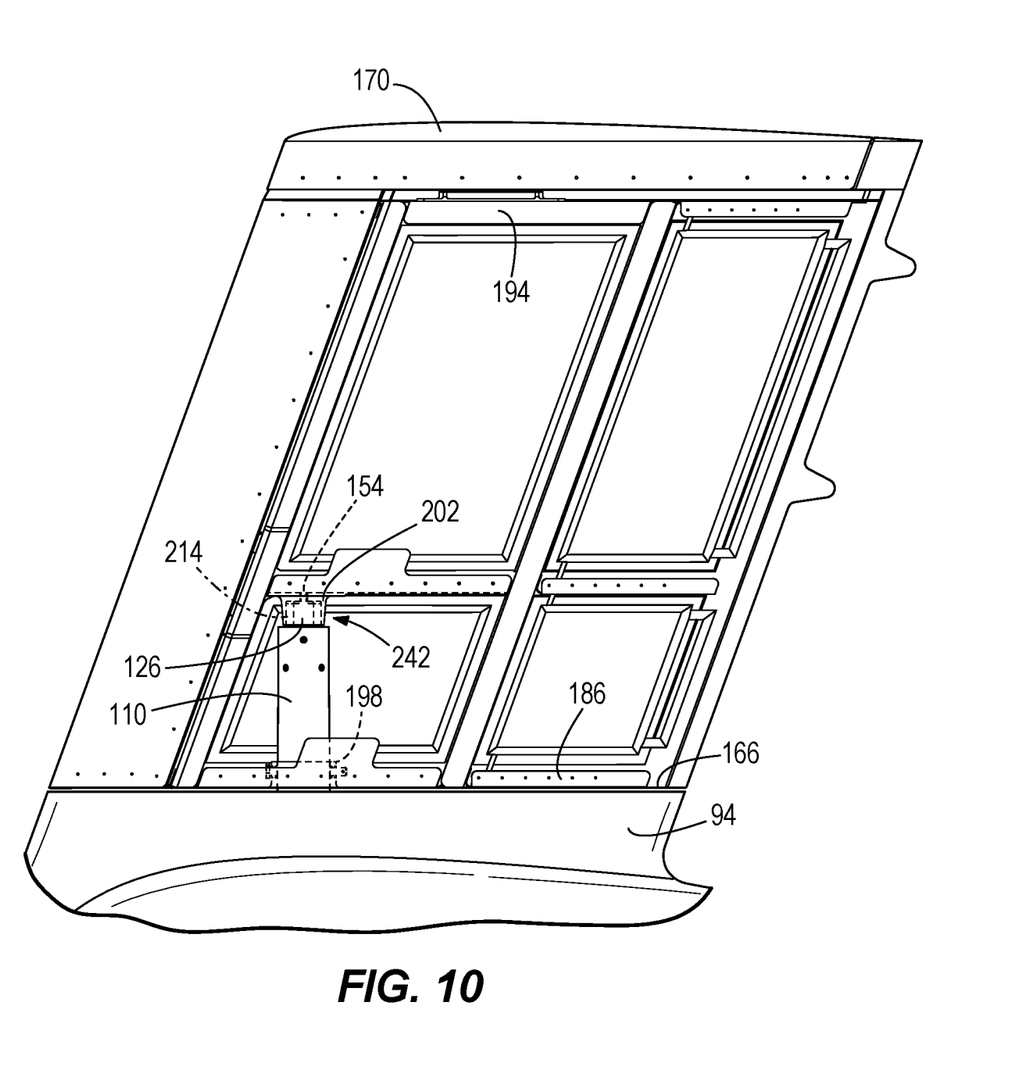
FIG. 10 illustrates the control surface of the control surface assembly of FIG. 3 in another assembly stage with a portion of the control surface removed.

As shown in FIGS. 8-10, to assemble the rudder assembly 78 to the empennage 22, the torque tube 110 must be installed in the fairing 94 via the brackets 230 to be rotatable relative to the fairing 94. The torque tube 110, including the cylindrical body 122 and the drive fitting 126, is installed so that it extends from the fairing 94 along the tube axis T to the free end 120. Once the torque tube 110 is installed and coupled to the actuator 234, the rudders 100 can be mounted to the torque tube 110. In some embodiments, one of the rudders 100 can be coupled to the torque tube 110 before the torque tube 110 is installed in the fairing 94. As seen in FIG. 8, the rudder 100 is positioned with the proximal end 166 adjacent the free end 120 of the torque tube 110. The rudder 100 is positioned so that the opening 198 in the proximal rib 186 and the receptacle 202 on the intermediate rib 190 are both centered on the tube axis T. As shown in FIG. 9, the rudder 100 can then be moved toward the fairing 94 along the tube axis T until the free end 120 of the torque tube 110 passes through the opening 198 in the proximal rib 186. The opening 198 then surrounds the cylindrical body 122 of the torque tube 110 and guides the rudder 100 as it continues to move along the axis T so that the proximal end 166 of the rudder 100 approaches the fairing 94 and the free end 120 of the torque tube 110, including the drive fitting 126, approaches the receptacle 202. The rudder 100 can then be rotated about the tube axis T until the orientation of the receptacle 202 matches the orientation of the mounted drive fitting 126. Specifically, the rudder 100 can be rotated until the noncircular profile 218 of the receptacle 202 is aligned with the noncircular profile 130 of the drive fitting 126, when viewed along the tube axis T (e.g., as seen in FIG. 7). As shown in FIG. 10, the rudder 100 is then moved along the tube axis T toward the fairing 94 so that the drive fitting 126 is received in the receptacle 202. As the drive fitting 126 is received in the receptacle 202, the stud 154 passes through the hole 222 in the end wall 210 of the receptacle 202 and extends past the intermediate rib 190. The rudder 100 is then secured to the torque tube 110 to axially fix the rudder 100 relative to the torque tube 110 by coupling the fastener 246 to the end of the stud 154. The stud 154 is easily accessed by an operator through an access panel 250 (FIG. 2) which allows access to the inside of the rudder 100 without exposing the components to the environment and with minimal work to enclose the rudder 100 once it has been coupled. The panel 250 may be removed before the assembly operation begins, and the panel 250 can be replaced once the rudder 100 has been installed.

The process described above can be repeated with the other rudder 100 and the other free end 120 of the torque tube 110.

In other words, a method of assembling a control surface assembly to an empennage of an aircraft may include providing the control surface assembly with a tube having a cylindrical body and a rudder with an opening and a connection feature. The tube may be mounted to the empennage so the tube extends from the empennage along a tube axis to a free end, wherein the tube is rotatable about the tube axis relative to the empennage. The rudder may be aligned so that the opening and the connection feature lie on the tube axis, and the rudder may be moved toward the empennage along the tube axis until the free end of the tube passes through the opening and approaches the connection feature. The rudder may be rotated about the tube axis until an orientation of the connection feature matches an orientation of the free end. The rudder may be moved along the tube axis toward the empennage until the free end engages the connection feature and rotatably fixes the rudder to the tube. The rudder may be secured to the tube to axially fix the rudder relative to the tube.

The opening is a circular opening and wherein the free end of the tube passing through the opening allows the opening to surround the cylindrical body. The connection feature includes a receptacle for receiving the free end of the tube, and the receptacle defines a cavity with a first noncircular profile. The free end of the tube further includes a second noncircular profile corresponding to the first noncircular profile. When the rudder is rotated until the orientation of the connection feature matches the orientation of the free end, the rudder is rotated until the first noncircular profile and the second noncircular profile are aligned when viewed along the tube axis. The first noncircular profile and the second noncircular profile are both square shaped. The free end of the tube engages the connection feature by the free end of the tube being received by the receptacle. The free end of the tube includes a stud extending along the tube axis. When the free end of the tube engages the connection feature, the stud extends through a hole in the receptacle. The rudder is secured to the tube by coupling a fastener to the stud to axially fix the rudder relative to the tube.

In operation, a pilot located in the cockpit 46 of the aircraft 10 can use controls (not shown) to generate a signal that is sent to the actuator 234. The actuator 234 then rotates the torque tube 110 about the tube axis T relative to the fairing 94. Rotation of the torque tube 110 is transferred to the upper rudder 102 and the lower rudder 106 by the respective connection elements 242. The movement of the rudder assembly 78 can stabilize or direct the aircraft 10 while in flight.

The described aircraft 10 offers several advantages. As discussed above, control surfaces (e.g. the rudders 100) are frequently subjected to high cycle vibrations. The described aircraft 10 utilizes a tube (e.g., the torque tube 110) to provide support to the control surface and transmit torque from an actuator 234 to the control surfaces. The tube also acts as a structural member for the control surface.

The tube carries all the forces and moments created by the engagement between the control surface and the air during flight. The opening 198 in the proximal rib 186 surrounds the tube and adds a second contact point, which allows shear forces and moments to be transferred from the control surface to the torque tube 110. Torsion and tension are transferred to the torque tube 110 through the engagement of the noncircular profiles 130, 218. The noncircular profiles 130, 218 are preferably square as this allows for geometric simplicity and cost efficient machining. The stud 154 can be used to preload the connection between the control surface (e.g., the rudder 100) and the torque tube 110. The preloaded connection increases resistance to high cycle vibratory loads. The stud 154 is located in a low stress region, and therefore doesn't interfere with the loading of the torque tube 110.

The described control surface assembly 78 is also easily installed by an operator. The single fastener 246 accessed through the panel 250 allows for minimal access to the inside of the control surface, while overcoming challenging ergonomics created by the control surface structure. The control surface is easily, reliably, and accurately installed through the process. The position of the control surface is determined solely by the engagement between the drive fitting 126 and the receptacle 202. The receptacle 202 is sized to receive the drive fitting 126 in a close-fit slide joint, creating an accurate rotational position of the control surface. The drive fitting 126 bottoms out in the receptacle 202, creating an accurate axial position of the control surface. Accurate positioning is achieved through the installation process without the need for additional positioning devices such as shims or other special processes.

Embodiments disclosed herein are primarily for exemplary purposes. it should be understood that alternative embodiments or various combinations of features described herein may be implemented.

Various features and advantages of the embodiments described herein are set forth in the following claims.

What is claimed is:

1. An aircraft comprising:
a main body having an empennage;
a main rotor assembly mounted on the main body; and
a movable control surface assembly supported on the empennage, the movable control surface assembly including:
a tube extending from the empennage along a tube axis to a free end, the tube being supported for rotation about the tube axis with respect to the empennage, and
a movable control surface mounted on the tube for rotation therewith, wherein the movable control surface is entirely supported on the empennage by the free end of the tube, and wherein the movable control surface is supported on the tube by a connection element that couples the movable control surface to the free end of the tube to rotatably fix the movable control surface with respect to the tube.

2. The aircraft of claim 1, further comprising an actuator connected between the empennage and the tube in order to rotate the tube and the movable control surface about the tube axis relative to the empennage.

3. The aircraft of claim 1, wherein the connection element includes a receptacle defining a cavity with a noncircular inner profile, and a drive fitting including a noncircular outer profile.

4. The aircraft of claim 3, wherein the drive fitting is received within the receptacle such that the respective noncircular profiles serve to rotatably fix the movable control surface to the tube.

5. The aircraft of claim 3, wherein the noncircular profiles are square shaped.

6. The aircraft of claim 3, wherein the receptacle is positioned on the movable control surface and the drive fitting is positioned on the free end of the tube.

7. The aircraft of claim 1, wherein the movable control surface extends between a proximal end and a distal end, and wherein the movable control surface includes a plurality of ribs, wherein the connection element is at least partially positioned on one of the plurality of ribs.

8. The aircraft of claim 7, wherein the plurality of ribs includes:
a proximal rib positioned at the proximal end of the movable control surface, the proximal rib having an opening allowing the tube to pass through the proximal rib; and an intermediate rib positioned between the proximal end and the distal end, the connection element is at least partially positioned on the intermediate rib.

9. The aircraft of claim 8, wherein the connection element includes a receptacle integrally formed with the intermediate rib, the receptacle including a cavity with a noncircular profile.

10. The aircraft of claim 9, wherein the tube includes a cylindrical body, and the connection element includes a drive fitting coupled to the cylindrical body at the free end of the tube.

11. The aircraft of claim 10, wherein the opening in the proximal rib has a circular profile and surrounds the cylindrical body, and wherein the drive fitting has a noncircular outer profile such that when the drive fitting is received within the cavity of the receptacle, the movable control surface is rotatably fixed with respect to the tube.

12. The aircraft of claim 1, wherein forces applied to the movable control surface are carried by the tube.

13. The aircraft of claim 1, wherein the empennage further includes a tail of the main body and a stabilizer extending from the tail, and wherein the movable control surface assembly is positioned at an end of the stabilizer distal from the tail.

14. The aircraft of claim 1, wherein the movable control surface is a first rudder, and the movable control surface assembly includes a second rudder mounted on the tube for rotation therewith.

15. An aircraft comprising:
a main body extending between a nose and a tail;
a main rotor assembly mounted on the main body between the nose and the tail;
a stabilizer extending out from the tail to an outer end;
a rudder assembly mounted to the outer end of the stabilizer, the rudder assembly including:
a tube rotatably supported on the outer end of the stabilizer, the tube extending along a tube axis between a first end and a second end;
a first rudder supported on the tube, the first rudder supported on the tube by a first connection element that engages the first end of the tube to rotatably fix the first rudder with respect to the tube; and
a second rudder supported on the tube, the second rudder supported on the tube by a second connection element that engages the second end of the tube to rotatably fix the second rudder with respect to the tube.

16. The aircraft of claim 15, wherein the outer end of the stabilizer includes a fixed fairing and the tube is supported on the outer end of the stabilizer within the fixed fairing.

17. The aircraft of claim 16, wherein the rudder assembly further includes an actuator extending between the outer end of the stabilizer and the tube, and the actuator rotates the tube, the first rudder, and the second rudder relative to the fixed fairing.

18. The aircraft of claim 15, wherein the first connection element includes a receptacle defining a cavity with a noncircular profile for receiving the first end of the tube.

19. The aircraft of claim 18, wherein the tube includes a first stud extending from the first end of the tube and the receptacle includes a hole extending through the receptacle, wherein when the first end of the tube is received within the cavity, the first stud extends through the hole.

20. The aircraft of claim 19, wherein the rudder assembly further includes a fastener coupled to the first stud to axially fix the first rudder to the tube.

* * * * *